Sept. 13, 1927.

R. J. MILLER

DISPENSING RECEPTACLE

Filed July 23, 1925

1,642,425

Inventor
Roy J. Miller

Patented Sept. 13, 1927.

1,642,425

UNITED STATES PATENT OFFICE.

ROY J. MILLER, OF MILWAUKEE, WISCONSIN.

DISPENSING RECEPTACLE.

Application filed July 23, 1925. Serial No. 45,627.

This invention relates to a dispensing receptacle.

In dispensing receptacles such as those commonly found in restaurants, it has been the practice to provide a spout through which the material may be poured, such for instance as the sugar dispensers now on the market.

This construction was adopted to avoid the contaminating action of a common spoon in the ordinary type of sugar bowls. However, the dispenser had the defect that it was impossible to exactly gauge the amount of material dispensed therefrom.

This invention is designed to overcome the above noted defects, and objects of such invention are to provide a dispenser of novel construction in which the amount of material dispensed may be accurately gauged by the patron in a very simple manner, so that the patron has all of the advantages of the use of a measuring spoon with none of the disadvantages due to contamination.

An embodiment of the invention is shown in the accompanying drawings, in which:—

Figure 1:
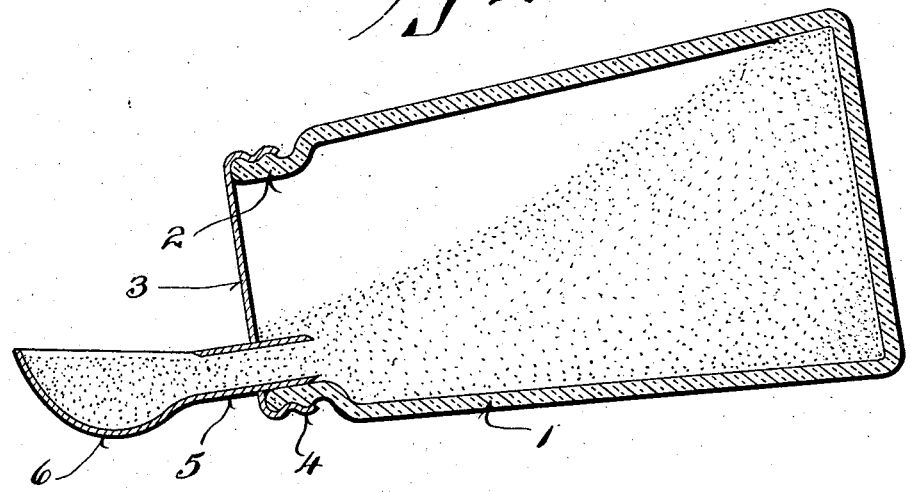
Figure 1 is a sectional view through the device showing it in one position.
Figure 2:
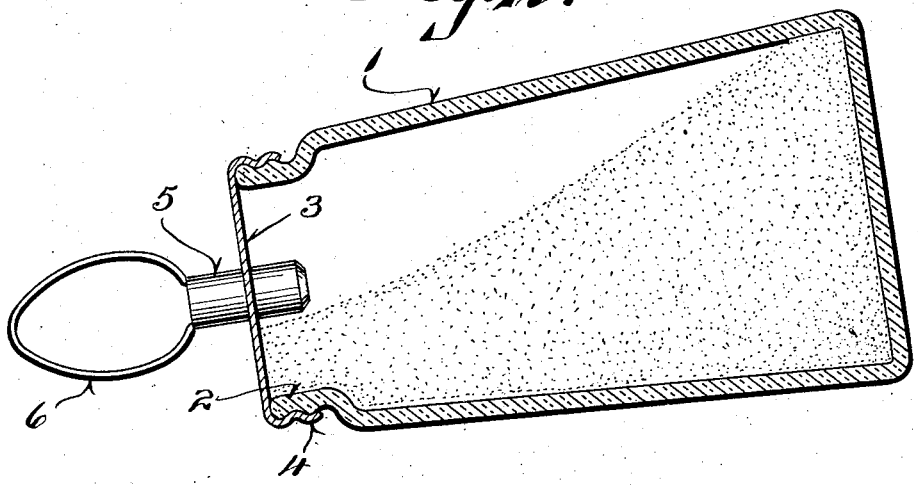
Figure 2 shows the device, after it has been turned through 90° about its axes, as in pouring the material from the measuring member.

Referring to the drawings, it will be seen that the dispensing device comprises a body portion 1 which may be, if desired, of glass and which is provided with an open mouth equipped with an externally threaded portion 2.

A removable cap 3, preferably of metal, is provided with a threaded flange 4 adapted to screw upon the end of the body portion 1. A tube 5 projects through the cap and extends into the body portion of the container. It terminates in a bowl-like member 6 which may be in the shape of a deep spoon, if desired, and which has an open top. This pipe or tube 5 is positioned at one side of the mouth of the body portion 1, as shown in Figure 1.

In using the device, the patron tilts it into the position shown in Figure 1, and the material will flow through the tube 5 and fill the measuring bowl 6. Thereafter, the device is rotated about its axes through approximately 90°, thus discharging the contents of the spoon or bowl 6 and shutting off any further supply of material from the interior of the body portion.

It will be seen, therefore, that a novel form of dispensing device has been provided which is of extreme simplicity, which may be cheaply manufactured, and which may be most easily handled.

Although the invention has been described in considerable detail, it is to be understood that the invention may be variously embodied and is, therefore, to be limited only as claimed.

I claim:

A dispensing receptacle comprising a hollow body portion having a mouth, a cap removably closing the mouth of the body portion and having a tube opening into the body portion and located on one side of said cap, said tube projecting into said body portion and having an outwardly projecting end and terminating at its outwardly projecting end in a bowl-like measuring member having an open side, the open side of said bowl-like member being presented at right angles to the axis of the body portion, whereby said body portion may be rotated about its axis to dispense material collecting in the bowl-like portion and to cause the tube to move eccentrically about said axis to an elevated position to stop further discharge of material into the bowl-like portion.

In testimony that I claim the foregoing I have hereunto set my hand at Milwaukee, in the county of Milwaukee and State of Wisconsin.

ROY J. MILLER.